United States Patent Office 3,037,152
Patented May 29, 1962

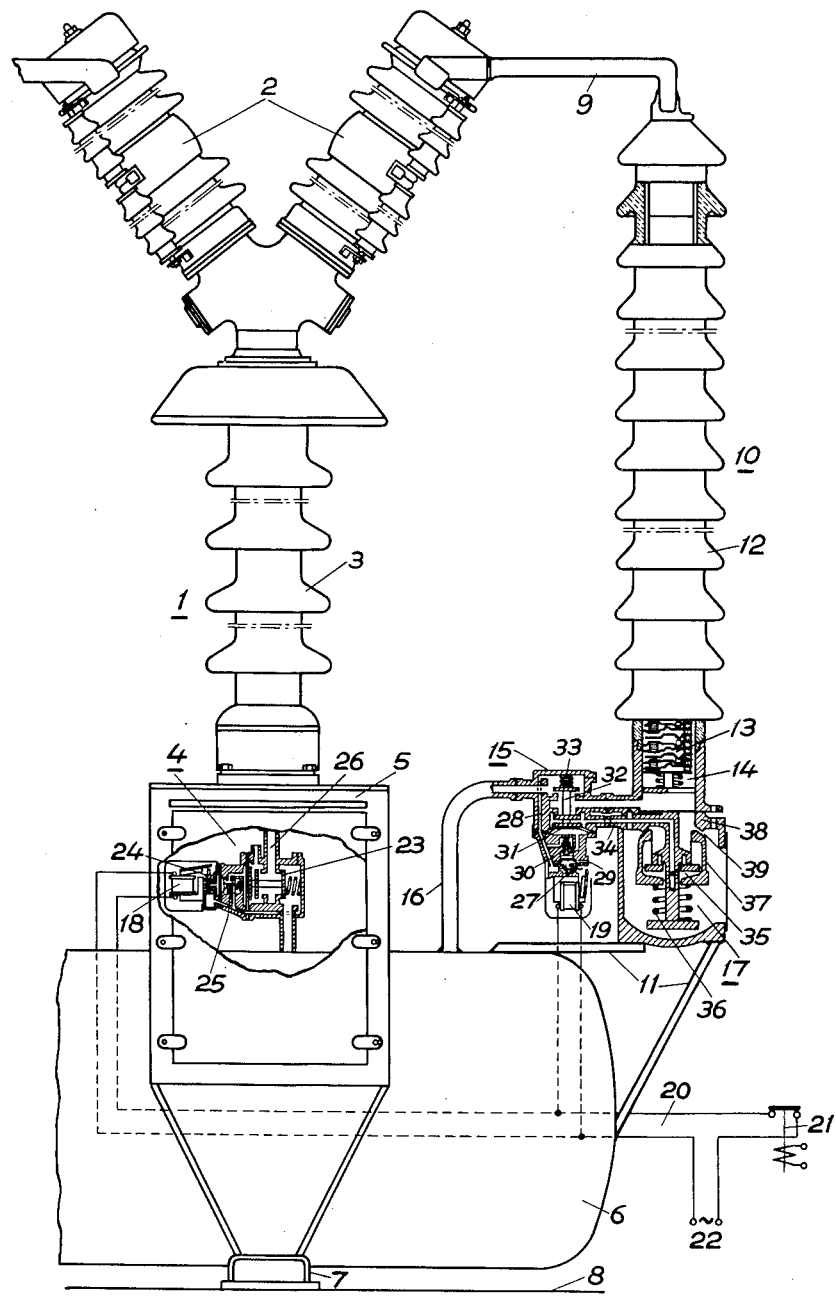

3,037,152
DEVICE FOR PROTECTING AN ELECTRIC PLANT AGAINST OVER-VOLTAGES
Lars R. Bergström, Ludvika, Sweden, assignor to Allmanna Svenska Elektriska Aktiebolaget, Vasteras, Sweden, a Swedish corporation
Filed July 9, 1957, Ser. No. 670,770
Claims priority, application Sweden Sept. 15, 1956
1 Claim. (Cl. 317—59)

The present invention relates to a device for protecting an electric HV-plant against over-voltages, especially switching surges which arise when a circuit breaker opens. Such switching surges arise, for instance, when a part of a plant comprising an inductance is disconnected from other parts of the network by opening a circuit breaker. The magnetic energy accumulated in the inductance then gives rise, together with distributed capacities, to electric oscillations, which arise between the phase conductor to which the inductance is connected, and ground. These oscillations can reach high voltage values, which may damage parts of a plant connected with the inductance or the opening breaker. In order to render these voltages harmless a damping resistor is arranged, as a rule in parallel with the opening breaking contacts. Hereby, the oscillations may be passed to the part of the network on the other side of the breaker and at the same time they are damped. These damping resistors must lie at the same potential as the breaker contacts and therefore be built together with them. Therefore the breaker construction is rather complicated. The present invention proceeds from the knowledge that said oscillations can be rendered harmless by means of resistances arranged in parallel to said inductance, i.e. resistances which are connected between a phase conductor and ground. They are suitably arranged on the side of the breaker to which the inductance is connected, i.e. usually on the station side. In order to avoid having to provide resistances of sufficient dimensions for continuous service they are connected in series with spark gaps which conduct when an over-voltage arises. The over-voltage protection device comprising resistances and spark gaps is distinguished from usual over-voltage arresters in that its sparkover voltage is reduced when an over-voltage surge produced by tripping a breaker occurs. Under steady-state conditions the spark-over voltage has a high value and the device has a reseal voltage, which is substantially similar to the reseal voltage of a normal lightning arrester designed for the rated voltage of the plant. A characteristic of the device is that the spark-over voltage of the spark gap is transiently reduced upon the opening of the breaker. The lower spark-over voltage value is chosen so that the protection device is active upon higher switching surges, which arise on the operation of the breaker, cooperating with the over-voltage protection device. In this respect, therefore, the protection device has the same object as the above mentioned damping resistors connected in parallel with the breaker contacts. As distinguished from these, however, the protection device is much simpler and cheaper. It can also be exchanged without bringing the breaker out of service for any length of time.

The spark-over voltage of the device under steady-state condition and under breaking condition is coordinated with the insulation level of the plant. As a measure for this level there are tests with A.C. voltage at power frequency, and with a standardized impulse voltage, which the plant equipment has to withstand according to existing standards. The impulse test voltage corresponds most nearly to the strength against transient over-voltages due to lighting and has the highest value. The crest value of the test voltage at power frequency is considerably lower and the strength of the equipment against switching surges, such as those which arise when the circuit breaker is operating, is somewhere between these values. Considering these facts the device according to the invention is designed as follows. The spark-over voltage is reduced under breaking conditions to a value which is, at the most, equal to the test voltage of the plant at power frequency. The steady-state spark-over voltage value can be chosen from two alternatives. The first alternative is based on the consideration of the fact that a lightning arrester, intended to protect against atmospheric over-voltages, besides the protection device according to the invention is connected between the phase conductor and ground. In this case the over-voltage protection device according to the invention should not participate in the diversion of atmospheric over-voltages and therefore the steady-state spark-over voltage chosen is higher than that of the said lightning arrester. According to the second alternative, the over-voltage protection device also serves, according to the invention, as an arrester for atmospheric over-voltages. In this case the steady-state impulse spark-over voltage of the protection device is dimensioned so that it is lower than the impulse test voltage of the protected part of the plant. This means that the spark-over voltage is substantially equal to that in a normal lightning arrester, before the steady-state spark-over voltage is transiently reduced upon the tripping of the breaker.

The enclosed FIGURE shows an embodiment of the invention and its application.

A pole 1 of an airblast circuit breaker is provided with a V-shaped breaking device, which consists of two series connected breaking contacts 2, the purpose of which is to break a current at power frequency in an electric HV-plant. Over a hollow pin insulator the breaking device is connected with an operating valve 4 arranged in an operating box 5. This rests, together with the pressure air tank 6 of the breaker, on a base part 7, standing on the foundation 8. One of the breaking contacts of the breaking device is connected by means of a conducting connecting bar 9, with an over-voltage arrester 10, which rests on the pressure air tank 6 by means of the supporting members 11. The over-voltage arrester comprises a porcelain housing 12, in which one or more spark gap stacks 13 and non-linear resistances, not shown on the drawing, are fixed. The vessel 14, in which the spark gap stack 13 is situated, is in contact with the pressure air tank 6 via the valve 15 and the conduit 16. The vessel 14 is further, via the exhaust valve 17, in contact with the open air, which is under atmospheric pressure. The tripping magnet 18 in the operating valve 4 of the breaker and the magnet 19 in the filling valve 15 of the spark gap, are in contact with a current source 22, via electric conductors 20 and the contact of a relay 21.

The air pressure in the tank 6 is normally in contact with the spark gap stack 13 of the arrester via the valve 15. The magnet 19 of this valve with the tripping magnet 18 of the breaker, simultaneously receive an operating impulse from the relay 21. When the magnet 18 receives voltage, the valve 23 in the operating device of the breaker, is opened via the servo valves 24 and 25. Hereby the air blast conduit 26 will be in contact with the tank and compressed air passes into the breaking contacts 2 in the breaking device, whereby the breaking contacts, not shown, are opened and the power current is broken by the breaker. At about the same time as the tripping magnet 18 of the breaker, the magnet 19 in the filling valve 15 of the spark gap, receives voltage and operates the spindle in the servo valve 27. Hereby the compressed air can no longer influence the diaphragm 29 via the conduit 28 and the spindle in the other servo valve 30 moves downwards. It will then stop the compressed air from flowing to the space below the diaphragms 31 and the main valve 32 is moved downwards by means of the compression spring 33. In this way the flow from the tank 6 to the vessel 14 for the spark gap stack 13, is closed. As the spindle of the main valve 32 moved downwards, air also began to flow from the tank 6 via the conduit 16, the air conduit 34 to the space 35 in the exhaust valve 17. Hereby a force, directed downwards, is actuated onto the control sleeve 37, against the force of the spring 36. This moves downwards and the connection between the control sleeve 37 and the valve body 38, until now closed, is opened at the surface 39. Through this opening the air will escape from the vessel 14 in the spark gap 13, into the air. When the relay contact 21 opens, the magnets 18 and 19 will be dead. Then, on the one hand, the operating valve 4 of the breaker closes and the air blast to the breaking contacts 2 is stopped, on the other hand, the servo valves and the main valve in the filling valve 15 of the arrester, return to their first positions. This means that the connection between the vessel 14 for the spark gap stack 13 and the surrounding atmospheric air is broken, because the exhaust valve 17 returns to its shown position. Consequently the connection between the tank 6 and the vessel 14 is opened again and this space is filled with compressed air.

The mode of operation of the filling valve 15 and the exhaust valve 17 results in that the spark gap stack 13, under steady-state conditions, is under pressure from the compressed air tank 6, which pressure is higher than the atmospheric pressure. The steady-state spark-over voltage of the gap and the steady-state spark-over voltage of the arrester 10 have therefore comparatively high values. This steady-state spark-over voltage value is chosen, as described before, depending on whether a lightning arrester, intended for protection against atmospheric over-voltages, is connected in the high-voltage plant. If there is such an arrester the over-voltage arrester 10 should not take part in the diversion of atmospheric over-voltages and the steady-state spark-over voltage chosen is therefore higher than that of the said lightning arrester. If the over-voltage arrester 10 has to also serve as an arrester against atmospheric over-voltages, however, the steady-state impulse spark-over voltage is so dimensioned that it is lower than the impulse test voltage of the protected plant. As described above, the vessel 14 is emptied when the breaker pole 1 opens and the spark-over voltage of the spark gap stack 13 and thus of the arrester 10, are reduced. The gap 13 is so designed that the spark-over voltage obtained has a value which is, at the most, equal to the test voltage value of the plant at power frequency. As the spark-over voltage of the arrester 10 is reduced upon the breaker opening, the reseal voltage of the arrester also decreases to a certain degree. As the vessel 14 is rapidly filled after the opening of the breaker the spark-over voltage however, and the reseal voltage of the arrester, rises again and the arrester 10 cuts off with an adequate margin of safety. The restoration of the high spark-over voltage can be accelerated by the magnet 19 being de-energized somewhat earlier than the magnet 18.

It is, of course, unnecessary to build the breaker 1 and the over-voltage arrester 10 together. Instead, the arrester 10 can be designed as a separate construction unit which is fed with compressed air from either the compressed air tank of the breaker or from a special compressed air tank. The magnet 19 of the filling valve need not of course be connected to the same electric circuit that feeds the tripping magnet 18 of the breaker. Different operating contacts can supply operating impulses to these magnets at substantially the same time. The reduction of the steady-state spark-over voltage of the arrester can also be made without transiently relieving the spark gap enclosed in a vessel, from a gas pressure which is higher than the atmospheric pressure. The spark gap electrodes can, for instance, be movable in relation to each other. In steady-state condition the electrodes then have a certain distance from each other which distance is transiently reduced upon the opening of the breaker, the switching surges of which have to be rendered harmless. Hereby the steady-state spark-over voltage of the arrester is also reduced. The invention may also be applied to breakers in which the power circuit is interrupted by means other than air blast. If, for instance, an oil minimum breaker is provided with a compressed air system for operating its movable contacts, this equipment can preferably be used for filling the spark gap of the arrester with compressed air. If the breaker is equipped with operating devices of another type, the arrester may be supplied with compressed air from another compressed air system or from an entirely separate compressed air equipment.

I claim as my invention:

An electric high voltage distribution system including a circuit breaker for interrupting a current path from one part of said system to another; on one side of said breaker a high inductance lying in the current path, protective means being connected between a point in the current path on said side of the breaker and earth and comprising a resistance and a spark-over gap in series connection, said spark-over gap being enclosed in a vessel filled with gas under pressure, said gas pressure on operation of the circuit breaker being reduced to such a low value that the spark-over gap breaks down and is subsequently restored to its initial value, the spark-over gap having a spark-over voltage which is substantially directly proportional to the air pressure in the arc gap, the impulse voltage value of said spark-over voltage being lower than the impulse test voltage of the plant.

References Cited in the file of this patent

UNITED STATES PATENTS

| | | |
|---|---|---|
| 1,194,195 | Jackson | Aug. 8, 1916 |
| 1,287,138 | Thomas | Dec. 10, 1918 |
| 1,700,853 | Randall | Feb. 5, 1929 |
| 1,939,035 | Bergvall | Dec. 12, 1933 |
| 2,246,926 | Roman | June 24, 1941 |
| 2,391,672 | Boehne | Dec. 25, 1945 |
| 2,414,308 | Kalb | Jan. 14, 1947 |
| 2,517,291 | Dewar | Aug. 1, 1950 |
| 2,600,149 | Yonkers | June 10, 1952 |
| 2,723,367 | Bockman | Nov. 8, 1955 |
| 2,794,886 | Roxburgh et al. | June 4, 1957 |